US006722173B2

United States Patent
Broese et al.

(10) Patent No.: US 6,722,173 B2
(45) Date of Patent: Apr. 20, 2004

(54) METHOD AND DEVICE FOR DETERMINING THE ROLLING FORCE IN A ROLL STAND

(75) Inventors: Einar Broese, Erlangen (DE); Bjoern Feldkeller, Munich (DE); Thomas Peuker, Baiersdorf-Hagenau (DE); Thomas Poppe, Maisach/Gernlinden (DE)

(73) Assignee: Siemens Aktiengesellschaft (DE)

( * ) Notice: Subject to any disclaimer, the term of this patent is extended or adjusted under 35 U.S.C. 154(b) by 0 days.

(21) Appl. No.: 09/962,370

(22) Filed: Sep. 24, 2001

(65) Prior Publication Data

US 2002/0011089 A1 Jan. 31, 2002

Related U.S. Application Data

(63) Continuation of application No. PCT/DE00/00887, filed on Mar. 22, 2000.

(30) Foreign Application Priority Data

Jun. 30, 1999 (DE) .......................................... 199 30 124
Sep. 23, 1999 (DE) .......................................... 199 13 126

(51) Int. Cl.$^7$ ............................................... B21B 37/16
(52) U.S. Cl. .............................. 72/7.2; 72/7.1; 706/16; 706/23
(58) Field of Search ........................... 72/7.1, 7.2, 7.6, 72/8.9, 9.2, 10.4, 11.6; 706/16, 17, 18, 21, 22, 23, 25

(56) References Cited

U.S. PATENT DOCUMENTS

| 5,513,097 A | * | 4/1996 | Gramckow et al. | ......... 364/148 |
| 5,600,758 A | * | 2/1997 | Broese et al. | .................. 395/21 |
| 5,740,686 A | * | 4/1998 | Martinetz et al. | ............ 72/8.42 |
| 5,778,151 A | * | 7/1998 | Gramckow et al. | ........... 395/22 |

FOREIGN PATENT DOCUMENTS

| DE | 4338615 | | 5/1995 | | |
| DE | 4338607 | | 6/1995 | | |
| DE | 4338608 | | 8/1995 | | |
| DE | 19728979 | | 9/1998 | | |
| DE | 19727821 | | 1/1999 | | |
| JP | 7-204718 | * | 8/1995 | .................... | 72/7.1 |
| JP | 11-707 | * | 1/1999 | .................... | 72/7.1 |

* cited by examiner

Primary Examiner—Ed Tolan
(74) Attorney, Agent, or Firm—Baker Botts LLP

(57) ABSTRACT

In a method for determining the rolling force in a roll stand for rolling metallic material which is to be rolled, the rolling force is determined by means of at least one neural network. According to the invention, the neural network is trained using, in particular measured, values for the rolling force under different operating conditions with a view to improving the determination of the rolling force. The neural network is advantageously trained using values for the rolling force and values for the different operating conditions for roll stands of different rolling trains.

12 Claims, 5 Drawing Sheets

METHOD AND DEVICE FOR DETERMINING THE ROLLING FORCE IN A ROLL STAND

This is a continuation of copending application Ser. No. PCT/DE00/00887 filed Mar. 22, 2000, PCT Publication WO 00/56477, which claims the priority of DE 199 13 126.0, filed Mar. 23, 1999 and DE 199 30 124.7 filed Jun. 30, 1999.

FIELD OF THE INVENTION

The invention relates to a method and a device for determining the rolling force in a roll stand for rolling metallic material to be rolled, the rolling force being determined by means of at least one neural network which is trained by using measured values for the rolling force under different operating conditions with a view to improving the determination of the rolling force.

BACKGROUND OF THE INVENTION

It is known to determine the rolling force by means of a rolling-force model which has a neural network. DE 197 27 821 A1 describes a method and a device for controlling and/or presetting a roll stand or a rolling train as a function of at least the rolling force. The rolling force is determined by means of a rolling-force model, and at least one neural network. To improve the quality of the rolling-force model, the neural network is trained while a rolling train which it is intended to control is operating. In this context, the term quality of model is to be understood as meaning the deviation between the actual rolling force and the rolling force which is determined by means of the rolling-force model. To achieve a high quality of model, this deviation should be as low as possible across the entire range of metals which are to be rolled by means of the roll stand.

SUMMARY OF THE INVENTION

It is an object of the present invention to increase the accuracy of the determination of the rolling force in a roll stand for rolling metallic material which is to be rolled compared to the known method. Accordingly, the rolling force in a roll stand for rolling metallic material to be rolled is determined by means of at least one neural network which is trained, using measured values for the rolling force under different operating conditions, and thereby improving the determination of the rolling force. The neural network is preferably trained using values for the rolling force and values for the different operating conditions for roll stands of different rolling trains.

The term operating conditions is to be understood as meaning, for example, the width of the metallic material which is to be rolled by means of the roll stand before it enters the roll stand, the thickness of the metallic material to be rolled before it enters the roll stand, the relative reduction in thickness of the metallic material which is rolled in the roll stand, the temperature of the metallic material to be rolled when it enters the roll stand, the tension in the metallic material which is to be rolled upstream of the roll stand, the tension in the metallic rolled material downstream of the roll stand, the radius of the working rollers of the roll stand, and the levels of iron, carbon, silicon, manganese, phosphorus, sulfur, aluminum, copper, molybdenum, titanium, nickel, vanadium, niobium, nitrogen, boron and/or tin in the metallic material to be rolled and, if appropriate, the modulus of elasticity of the rollers.

Although in known methods for determining the rolling force in a roll stand using a neural network, the rolling force is specially matched to the roll stand by training, the present invention leads to a more precise determination of the rolling force for the roll stand across the entire range of metals which are to be rolled by means of the roll stand.

In a preferred embodiment of the present invention, the neural network is trained using values for the rolling force and values for the different operating conditions for at least one roll stand from a roughing train and at least one roll stand from a finishing train.

Other preferred embodiments of the present invention are disclosed herein below, the first of which is wherein the neural network is trained using values for the rolling force and values for the different operating conditions for roll stands of rolling trains of different rolling mills. This embodiment leads to particularly accurate determination of the rolling force in a roll stand, even though roll stands of different rolling mills, i.e. different plants, are used for training.

In the next embodiment, the neural network is trained using values for the rolling force and values for the different operating conditions for roll stands of rolling trains of at least five different rolling mills. In this embodiment, the accuracy of determination of the rolling force can be increased even further.

In the next embodiment, the neural network is used to determine a correction value for correcting (e.g., by multiplication) a value for the rolling force which is determined by means of an analytical rolling-force model. The linking of analytical models and neural networks is disclosed, for example, in DE 43 38 607 A1, DE 43 38 608 A1 and DE 43 38 615 A1. In particular, a structure as described in DE 43 38 607 A1 has proven particularly advantageous in connection with linking by multiplication.

In a further preferred embodiment, a stand-specific correction value for correcting the value for the rolling force which is determined by means of the analytical rolling-force model is determined by means of a stand network. The stand network is in the form of a neural network, as a function of physical properties of the metallic material which is to be rolled (e.g. the width of the metallic material which is to be rolled by means of the roll stand before it enters the roll stand, the thickness of the metallic material which is to be rolled before it enters the roll stand, the relative reduction in thickness of the metallic rolled material in the roll stand, the temperature of the metallic material which is to be rolled when it enters the roll stand, the tension in the metallic material which is to be rolled upstream of the roll stand, the tension in the metallic rolled material downstream of the roll stand and the radius of the working rollers of the roll stand, and of physical properties of the roll stand (e.g. the modulus of elasticity of the rollers).

A further advantageous embodiment of the present invention utilizes a chemistry-specific correction value for correction of the value for the rolling force. The rolling force is determined by means of the analytical rolling-force model. The correction value is determined by means of a chemistry network. The chemistry network is in the form of a neural network, as a function of chemical properties of the metallic material which is to be rolled (e.g. the levels of iron, carbon, silicon, manganese, phosphorus, sulfur, aluminum, chromium, copper, molybdenum, titanium, nickel, vanadium, niobium, nitrogen, boron and/or tin in a metallic material to be rolled).

This division into a stand-specific correction value and a chemistry-specific correction value, in conjunction with the invention, leads to a further improved accuracy in the determination of the rolling force. Further, under certain operating conditions of the roll stand, the accuracy of determination of the rolling force is significantly improved if, in combination with the invention, a microstructure-specific correction value for correction of the value for the rolling force which is determined by means of the analytical rolling-force model is determined by means of a microstructure network, which is in the form of a neural network, as a function of chemical properties of the metallic material which is to be rolled and the temperature of the metallic material which is to be rolled. In this context, chemical properties are, for example, the levels of iron, carbon, silicon, manganese, phosphorus, sulfur, aluminum, chromium, copper, molybdenum, titanium, nickel, vanadium, niobium, nitrogen, boron and/or tin in the metallic material which is to be rolled. This applies in particular if a distinction is drawn between a stand-specific correction value, a chemistry-specific correction value and a microstructure-specific correction value.

In yet another preferred embodiment of the present invention, the correction value of at least one neural network is multiplied by a confidence value. The confidence value forms a statistical measure for the reliability of the correction value. The confidence value is advantageously between 0 and 1.

The invention is used to particularly good effect for the presetting of a rolling train. In this case, the rolling force which is to be expected when rolling the metallic material to be rolled is determined in advance and is used to preset the rolling train, i.e. for example to adjust the roll nips on the roll stands, before the metallic material to be rolled enters the rolling train. Finally, in a very practical embodiment of the present invention, the rolling force is determined by means of at least two neural networks, the output values of which are linked.

BRIEF DESCRIPTION OF THE DRAWINGS

Further advantages and details are apparent from the following detailed description of exemplary embodiments taken in context with the drawings. The exemplary embodiments relate to the rolling of steel. If suitably adapted, it is also possible to roll other metals, for example aluminum.

DETAILED DESCRIPTION OF THE INVENTION

Figure 1:
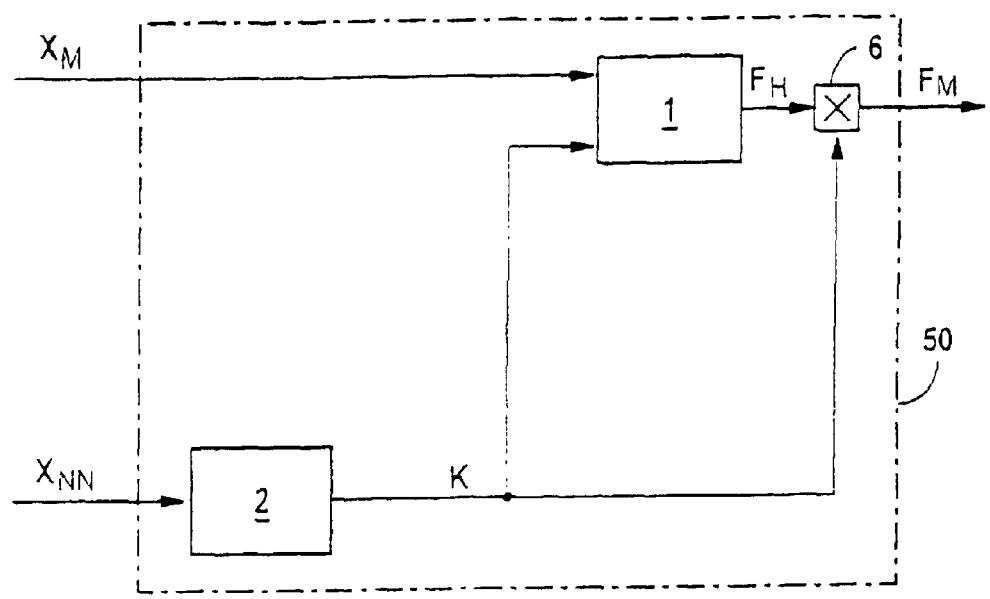
FIG. 1 shows a rolling-force model.

FIG. 1 shows a rolling-force model 50 for determining the rolling force $F_H$ in a roll stand. The rolling-force model 50 has an analytical model 1 and a neural network 2. Input variables $X_M$ and, optionally, a correction value k are input into the analytical rolling-force model 1. The input variables $X_M$ of the analytical rolling-force model 1 are, in a preferred embodiment, the modulus of elasticity of the rollers of the roll stand, the width of the steel which is to be rolled by means of the roll stand before it enters the roll stand, the thickness of the steel before it enters the roll stand, the relative reduction in thickness of the steel in the roll stand, the temperature of the steel when it enters the roll stand, the tension in the steel upstream of the roll stand, the tension in the steel downstream of the roll stand and the radius of the working rollers of the roll stand. The analytical rolling-force model 1 supplies, as output variable, an approximate value $F_M$ for the rolling force, which is multiplied by the correction value k by means of a multiplier 6 and thereby supplies a value $F_H$ for the rolling force, which is the output variable of the rolling-force model 50.

The correction value k is determined by means of the neural network 2 as a function of its input variables $X_{NN}$. The input variables $X_{NN}$ of the neural network 2 comprise, in one exemplary embodiment, the width of the steel which is to be rolled by means of the roll stand before it enters the roll stand, the thickness of the steel before it enters the roll stand, the relative reduction in thickness of the steel in the roll stand, the temperature of the steel when it enters the roll stand, the tension in the steel upstream of the roll stand, the tension in the steel downstream of the roll stand, the radius of the working rollers of the roll stand, the circumferential speed of the working rollers of the roll stand, the level of carbon and preferably the level of silicon in the steel. Furthermore, it is preferred if the input variables $X_{NN}$ of the neural network 2 also comprise the levels of manganese, phosphorus, sulfur, aluminum, chromium, copper, molybdenum, titanium, nickel, vanadium, niobium, nitrogen, boron and/or tin in the steel.

Figure 2:
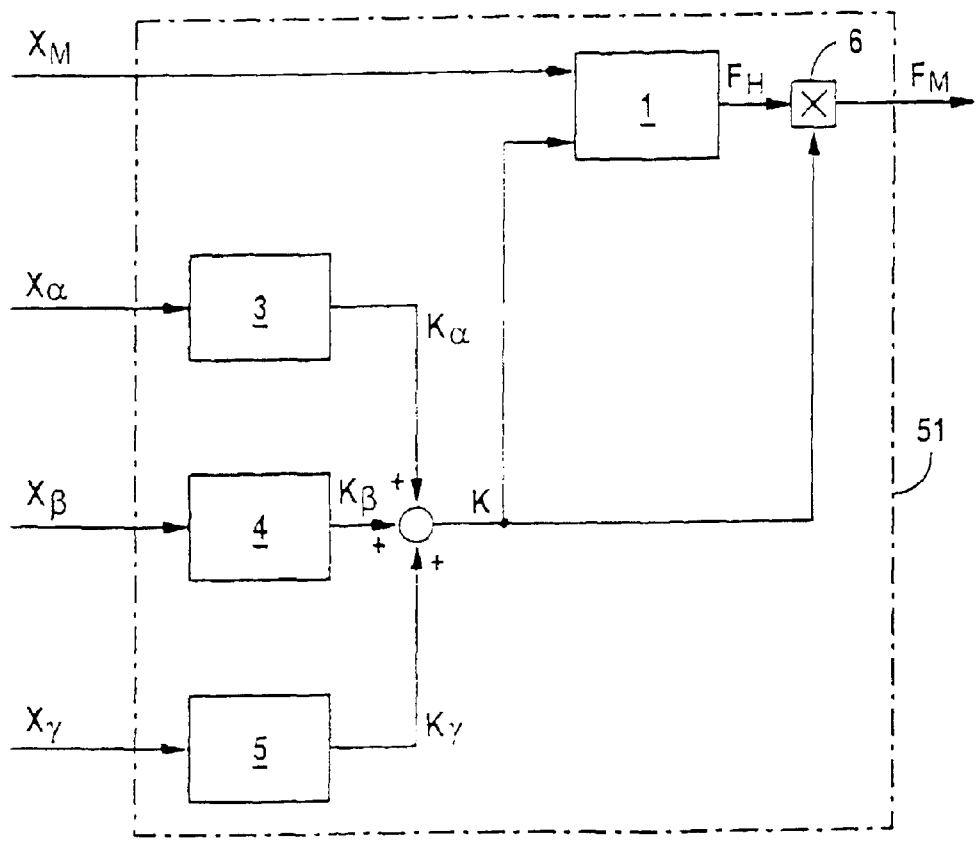
FIG. 2 shows a first advantageous rolling-force model.

FIG. 2 shows a particularly preferred embodiment for a rolling-force model. This rolling-force model, which is denoted by reference numeral 51, like the rolling-force model 50 shown in FIG. 1, has an analytical rolling-force model 1 and a multiplier 6. By contrast, the neural network 2 shown in FIG. 1 is replaced by three neural networks 3, 4, 5, the outputs $k_\alpha$, $k_\beta$ and $k_\gamma$ which are added to form the correction factor k.

Reference numeral 3 denotes a neural network which is referred to as the chemistry network and determines a chemistry-specific correction value $k_\alpha$ as a function of its input variables $X_\alpha$. The input variables $X_\alpha$ advantageously comprise the level of carbon in steel and advantageously the level of silicon in the steel. Furthermore, it is advantageous if the input variables $X_\alpha$ of the neural network 2 also comprise the levels of manganese, phosphorus, sulfur, aluminum, chromium, copper, molybdenum, titanium, nickel, vanadium, niobium, nitrogen, boron and/or tin in the steel.

Reference numeral 4 denotes a neural network which is referred to as the microstructure network and determines a microstructure-specific correction value $k_\beta$ as a function of its input variables $X_\alpha$. The input variables $X_\beta$ advantageously comprise the temperature of the steel when it enters the roll stand and the levels of carbon in the steel, and also, preferably the level of silicon in the steel. Furthermore, it is advantageous if the input variables $X_\beta$ of the neural network 2 also comprise the levels of manganese, phosphorus, sulfur, aluminum, chromium, copper, molybdenum, titanium, nickel, vanadium, niobium, nitrogen, boron and/or tin in the steel. Reference numeral 5 denotes a neural network which is referred to as the stand network, which calculates a stand-specific correction value $K_\gamma$ as a function of its input variables $X_\gamma$. The input variables $X_\gamma$ advantageously comprise the width of the steel which is to be rolled by means of the roll stand before it enters the roll stand, the thickness of the steel before it enters the roll stand, the relative reduction in thickness of the steel in the roll stand, the temperature of the steel when it enters the roll stand, the tension in the steel upstream of the roll stand, the tension in the steel downstream of the roll stand and the radius of the working rollers of the roll stand.

Figure 3:
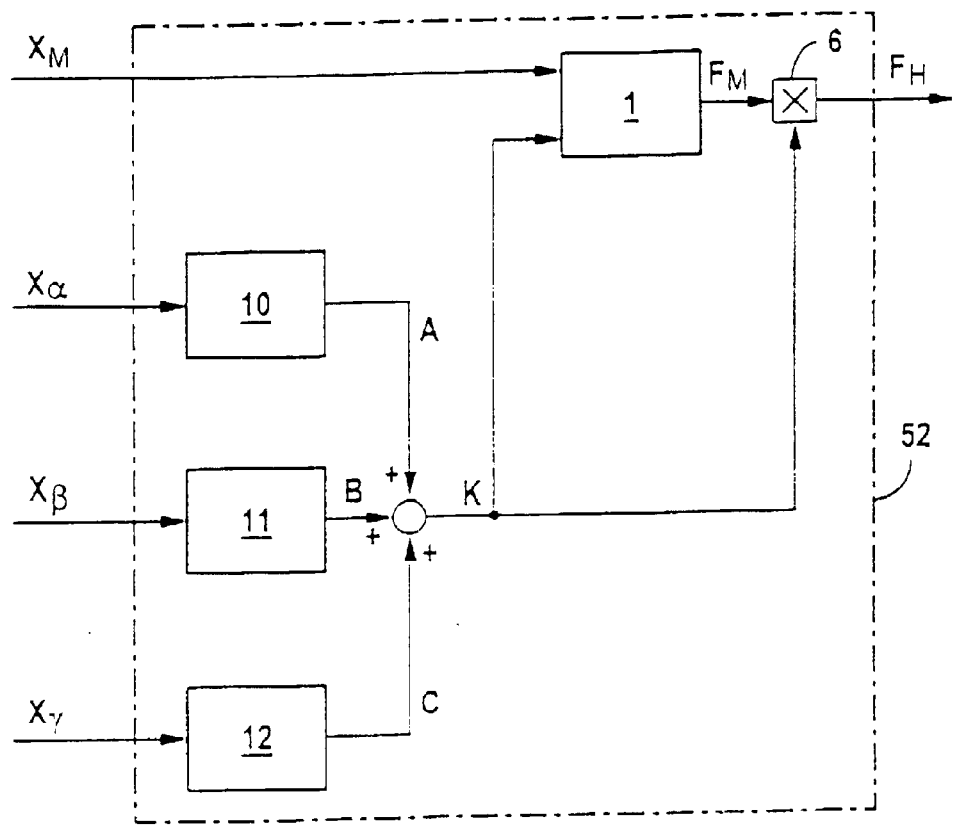
FIG. 3 shows another advantageous rolling-force model.

FIG. 3 shows a further preferred embodiment for a rolling-force model. This rolling-force model, which is denoted by reference numeral 52, also has an analytical rolling-force model 1 and a multiplier 6. According to this exemplary embodiment, the chemistry network 3 of the rolling-force model 51 is replaced, in the rolling-force model 52, by a chemistry correction block 10. The microstructure network 4 of the rolling-force model 51 is replaced, in the rolling-force model 52, by a microstructure correction block 11. The stand network 5 of the rolling-force model 51 is replaced, in the rolling-force model 52, by a stand correction block 12. Output variables from the chemistry correction block, the microstructure correction block and the stand correction block are denoted by A, B and C. The sum of these output variables forms the correction value k.

Figure 4:
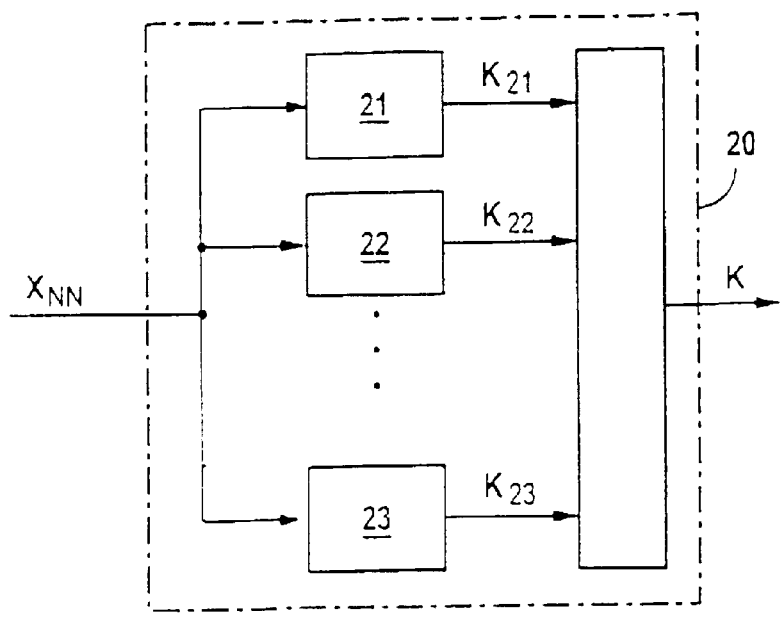
FIG. 4 shows a correction for linking neural networks.

FIG. 4 shows a correction block 20, the input variables of which are the variables $X_{NN}$ and the output variable of which is the correction value k. The correction block 20 has neural networks 21, 22, 23 and a linking block 24. Output variables of the neural networks are correction values $k_{21}$, $k_{22}$ and $k_{23}$, which are linked by means of the linking block 24 to form the correction value k. For this purpose, the linking block 24 advantageously forms the mean of the correction values $k_{21}$, $k_{22}$, and $k_{23}$ and outputs this mean as correction value k. The neural networks 21, 22, 23 have the same functionality. However, they are neural networks of different structures, i.e. neural networks with a different number of nodes and/or neural networks which undergo different training methods.

The correction block 20 replaces the neural network 2 in FIG. 1. Furthermore, it is in particular possible for the chemistry correction block 10, the microstructure correction block 11 and the stand correction block 12 to be replaced in each case by one correction block 20. In this case, for correction block 20 $X_{NN}$ and k are to be replaced by $X_\alpha$ and A, $X_\beta$ and B and $X_\gamma$ and C.

Figure 5:
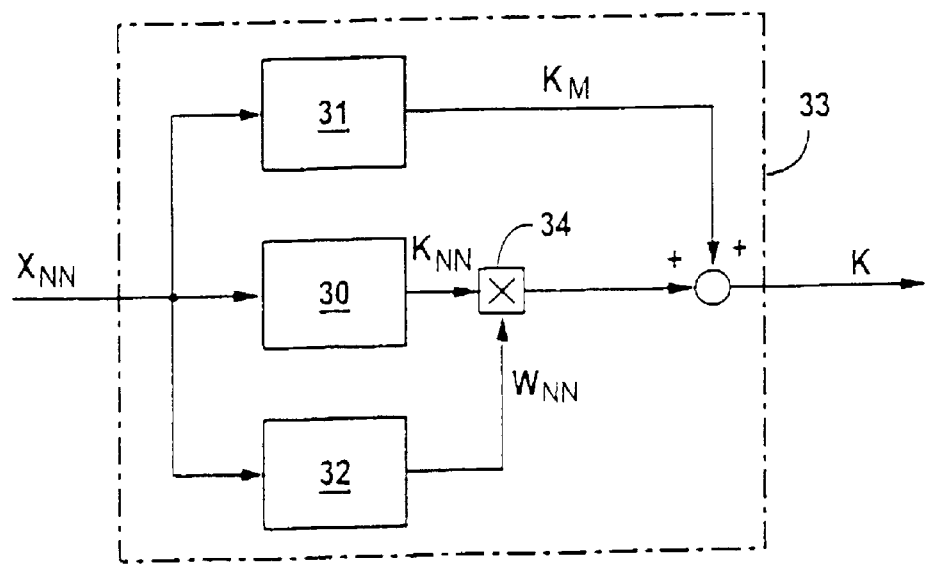
FIG. 5 shows a weighting structure for a neural network.

FIG. 5 shows a weighting correction block 33, the input variables of which are the variables $X_{NN}$ and the output variable of which is the correction value k. The weighting correction block 33 has a neural network 30, a regression model 31, a weighting block 32 and a multiplier 34. The output variable of the weighting block 32 is a confidence value $W_{NN}$, which may adopt values between 0 and 1. The confidence value WNN forms a statistical measure of the reliability of a correction value $k_{NN}$ output from the neural network 30. The regression model 31 also outputs a correction value $k_M$. The correction value $k_{NN}$ determined by the neural network 30 is multiplied by the confidence value WNN by means of the multiplier 34. The correction value $k_M$ determined by means of the regression model 31 is added to the product of $k_{NN}$ and WNN. This sum forms the correction value k. It is advantageous for the neural network 2 to be replaced by the weighting correction block 33.

The chemistry correction block 10, the microstructure correction block 11 and the stand correction block 12 can be replaced by a weighting correction block similar to weighting correction block 33. In this case $X_{NN}$ and k are to be replaced by $X_\alpha$ and $k_\alpha$, $X_\beta$ and $k_\beta$ and $X_\gamma$ and $k_\gamma$. The neural network 30 may be replaced by the correction block 20. In this case, the correction value k in FIG. 4 replaces the correction value $k_{NN}$ in FIG. 5.

Figure 6:
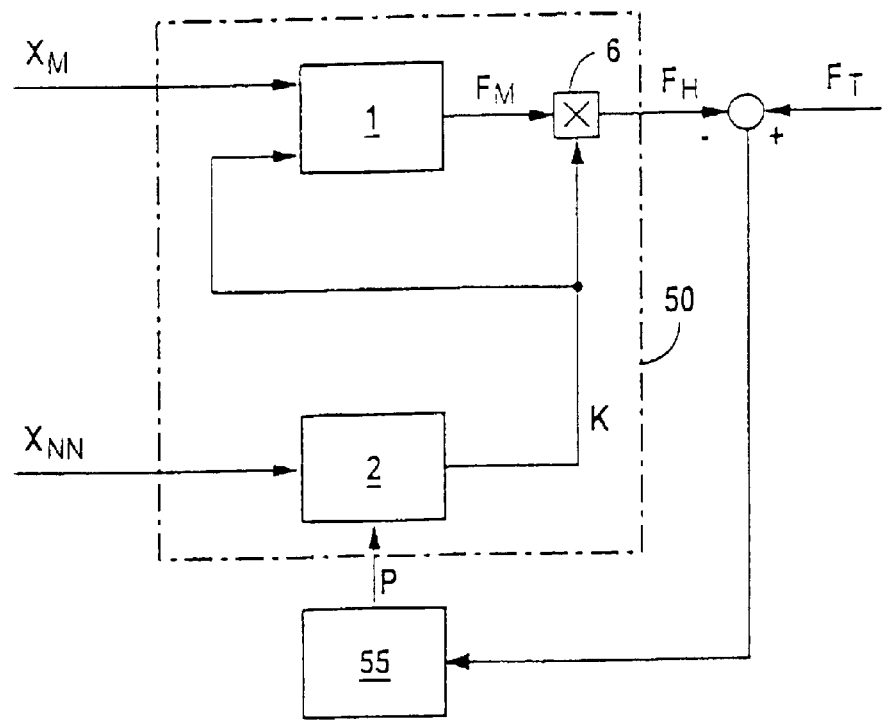
FIG. 6 shows a learning method for a neural network.

FIG. 6 shows a learning method for the neural network 2 from FIG. 1. For this purpose, the value $F_H$ for the rolling force which is determined by means of the rolling-force model 50 is subtracted from a measured value FT for the actual rolling force. The difference is passed to the learning algorithm 55, which determines the parameters P of the new network 2. This method can be extended in a corresponding way to the neural networks 2, 3, 4, 5, 21, 22, 23 and 30 if the rolling-force model 50 is added to or replaced in accordance with the explanations given above.

Figure 7:
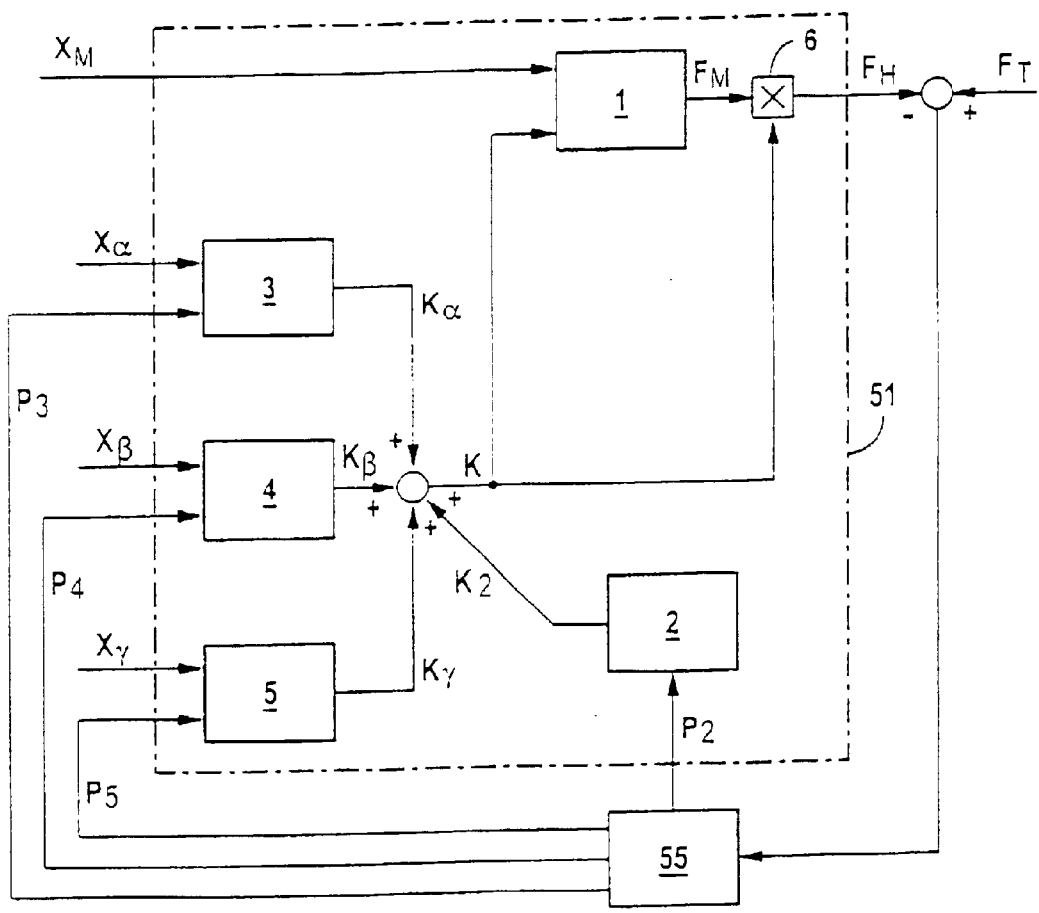
FIG. 7 shows a modification to the learning method shown in FIG. 6.

In FIG. 7, the learning method which has been described with reference to FIG. 6 is modified to the extent that the neural networks 3, 4, 5 and the function block 2 from FIG. 1 are shown. For this purpose, the value $F_H$ for the rolling force which is determined by means of the rolling-force model 51 is subtracted from a measured value $F_T$ for the actual rolling force. This difference is passed to the learning algorithm 55, which determines new parameters $P_3$, $P_4$, $P_5$ for the neural networks 3, 4, 5, or corresponding correction factors for the parameters of the neural networks 3, 4, 5. Furthermore, the learning algorithm 55 determines a new value for the correction value $k_2$ or a correction value $P_2$ for correcting the correction value $k_2$. Correspondingly, this procedure may be applied to the neural networks in the correction blocks 10, 11 and 12 and to the neural networks 21, 22, 23 and 30 in FIG. 3, FIG. 4 and FIG. 5.

The data $X_M$ in $X_{NN}$, $X_\alpha$, $X_\beta$, $X_\gamma$, and $F_T$ are used to train the neural networks 2, 3, 4, 5, 21, 22, 23 and 30. It is advantageous if these data originate from different rolling mills.

Figure 8:
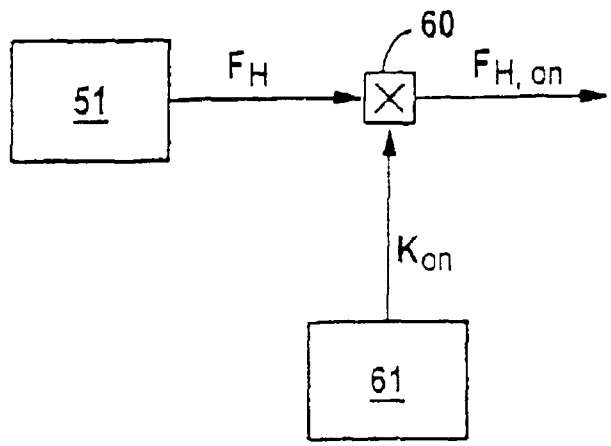
FIG. 8 shows a correction for a rolling-force model.

It is possible for the stand network 5 to be trained further online after it has been installed in a plant. However, it is particularly advantageous for the rolling-force model 51 or 52, after fitting in a plant, to be left unchanged with regard to its parameters, and to additionally provide for correction of the output $F_H$ of the rolling-force model 51 or of the rolling-force model 52. As shown in FIG. 8, the value $F_H$ is multiplied, by means of a multiplier, by a correction value $k_{on}$ which is stored, for example, in a memory 61. As an alternative to multiplication, it is also possible to provide for some other form of operation, for example addition. The product of $F_H$ and $k_{on}$ is a corrected value $F_{H,on}$ for the rolling force.

Figure 9:
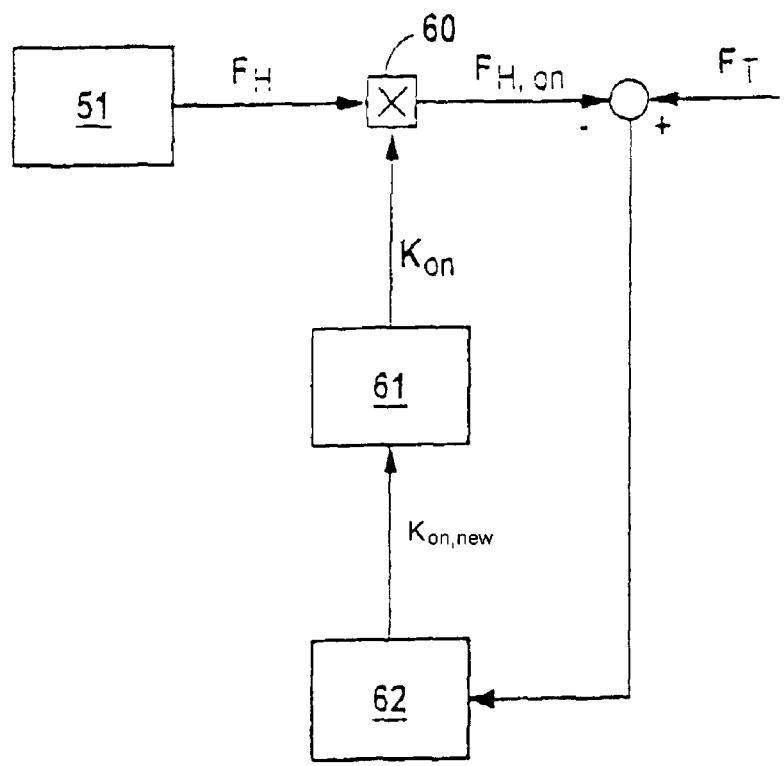
FIG. 9 shows online adaptation of a correction in accordance with FIG. 8.

While the parameters of the rolling-force model 51 or 52 remain unchanged after installation in the plant, the correction factor $k_{on}$ can be adapted online, as illustrated in detail in FIG. 9. For this purpose, the difference between $F_{H,on}$ and a measured value $F_T$ for the actual rolling force is fed to a learning algorithm 62. The learning algorithm 62 is used to determine a new correction value $k_{on,new}$ which replaces the previous correction value $k_{on}$.

We claim:

1. A method for determining the rolling force in a roll stand for rolling metallic material to be rolled, comprising determining the rolling force by at least one neural network, training said network using measured values for the rolling force under different operating conditions so as to improve the determination of the rolling force, wherein the at least one neural network is trained using values for the rolling force and values for operating conditions for rail stands of different rolling trains of a different rolling mills and further wherein at least one neural network is trained using values for the rolling force and values for the different operating conditions for roll stands of rolling trains of at least five different rolling mills.

2. The method according to claim 1, wherein the at least one neural network is trained using values for the rolling force and values for the different operating conditions for at least one roll stand from a roughing train and at least one roll stand from a finishing train.

3. The method according to claim 1, further comprising using the at least one neural network to determine a correction value for correcting a value for the rolling force, said value being determined by an analytical rolling-force model.

4. The method according to claim 3, wherein a stand-specific correction value is determined by a stand network as a function of physical properties of the metallic material to be rolled and of the roll stand, said stand network being in the form of a neural network.

5. The method according to claim 3, wherein a chemistry-specific correction value is determined by a chemistry network as a function of chemical properties of the metallic material which is to be rolled, said chemistry network being in the form of a neural network.

6. The method according to claim 3, wherein a microstructure-specific correction value is determined by a microstructure network as a function of chemical properties of metallic material which is to be rolled and temperature of the metallic material which is to be rolled, said microstructure network being in the form of a neural network.

7. The method according to claim 3, 4, 5 or 6, further comprising multiplying the correction value by a confidence value, the confidence value forming a statistical measure for the reliability of the correction value.

8. The method according to claim 1, further comprising determining the rolling force by at least two neural networks, the output values of which are linked.

9. A method for presetting a rolling train as a function of the rolling force expected during rolling, said rolling force being determined using the method according to claim 1.

10. The method according to claim 1 further for comprising determining the rolling force by (a) at least one microstructure network in the form of a neural network, and as a function of chemical properties and temperature of the metallic material which is to be rolled; by (b) at least one stand network in the form of a neural network, and as a function of physical properties of the metallic material which is to be rolled and of the roll stand; and (c) at least one chemistry network in the form of a neural network, and as a function of chemical properties of the metallic material which is to be rolled.

11. An apparatus for determining the rolling force in a roll stand for rolling metallic material to be rolled comprising at least one neural network which is trained using values for the rolling force under operating conditions for rolling stands of different roll trains of a different rolling mills and further wherein at least one neural network is trained using values for the rolling force and values for the different operating conditions for roll stands of rolling trains of at least five different rolling mills.

12. An apparatus according to claim 11, comprising a microstructure network which is dependent on chemical properties and temperature of the metallic material which is to be rolled, a stand network which is dependent on physical properties of the metallic material which is to be rolled and of the roll stand, and a chemistry network which is dependent on chemical properties of the metallic material which is to be rolled, the said microstructure network, stand network and chemistry network being neural networks.

* * * * *